US011391811B2

(12) United States Patent
Han et al.

(10) Patent No.: US 11,391,811 B2
(45) Date of Patent: *Jul. 19, 2022

(54) OTDOA (OBSERVED TIME DIFFERENCE OF ARRIVAL) POSITIONING ENHANCEMENT BY USING HETEROGENEOUS REFERENCE SIGNALS

(71) Applicant: Apple Inc., Cupertino, CA (US)

(72) Inventors: Seunghee Han, San Jose, CA (US); Alexey Khoryaev, Nizhny Novgorod (RU); Yang Tang, Pleasanton, CA (US); Zhibin Yu, Unterhaching (DE); Shafi Bashar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/852,914

(22) Filed: Apr. 20, 2020

(65) Prior Publication Data

US 2020/0386852 A1 Dec. 10, 2020

Related U.S. Application Data

(63) Continuation of application No. 15/539,896, filed as application No. PCT/US2015/067400 on Dec. 22, 2015, now Pat. No. 10,627,478.

(Continued)

(51) Int. Cl.
*H04B 17/00* (2015.01)
*G01S 5/10* (2006.01)
(Continued)

(52) U.S. Cl.
CPC ................. *G01S 5/10* (2013.01); *G01S 1/20* (2013.01); *G01S 5/0236* (2013.01)

(58) Field of Classification Search
CPC ......... H04W 52/0216; H04W 52/0219; H04W 52/0209; H04B 7/0452; Y02B 30/70;
(Continued)

(56) References Cited

U.S. PATENT DOCUMENTS

| | | | | |
|---|---|---|---|---|
| 10,627,478 | B2 * | 4/2020 | Han | G01S 5/0236 |
| 2010/0309867 | A1 * | 12/2010 | Palanki | H04L 5/0091 370/329 |

(Continued)

FOREIGN PATENT DOCUMENTS

| | | | |
|---|---|---|---|
| CN | 102869038 | A | 1/2013 |
| CN | 103634899 | A | 3/2014 |
| WO | 2011139201 | A1 | 11/2011 |

OTHER PUBLICATIONS

International Search Report and the Written Opinion of the International Searching Authority, PCT/US2015/067400, dated Mar. 30, 2016.

(Continued)

*Primary Examiner* — Nhan T Le
(74) *Attorney, Agent, or Firm* — Eschweiler & Potashnik, LLC

(57) ABSTRACT

Techniques for observed time difference of arrival (OTDOA) positioning based on heterogeneous reference signals (RSs) are discussed. One example apparatus configured to be employed within a user equipment (UE) comprises receiver circuitry, a processor, and transmitter circuitry. The receiver circuitry can receive, from each of a plurality of evolved Node Bs (eNBs), one or more RSs of each of a plurality of distinct types of RSs. The processor can determine, for each of the eNBs, a time of arrival (TOA) of the one or more RSs of each of the plurality of distinct types of RSs; and compute, for each of the eNBs, a reference signal time difference (RSTD) based at least in part on the TOAs of the one or more RSs of each of the plurality of distinct (Continued)

400

410 OPTIONALLY RECEIVE CONFIGURATION FOR ENHANCED RSTD

420 RECEIVE A SET OF PRSs FROM A PLURALITY OF eNBs

430 RECEIVE ONE OR MORE ADDITIONAL SETS OF DISTINCT RSs FROM THE PLURALITY OF eNBs

440 MEASURE TOA FOR EACH RECEIVED PRS AND ADDITIONAL RS FROM EACH eNB

450 CALCULATED RSTD FOR EACH eNB BASED AT LEAST IN PART ON MEASURED TOAs FOR PRSs AND ADDITIONAL DISTINCT RSs

460 TRANSMIT CALCULATED RSTDs types of RSs. The transmitter circuitry can transmit the RSTD computed for each of the eNBs.

24 Claims, 13 Drawing Sheets

Related U.S. Application Data

(60) Provisional application No. 62/107,627, filed on Jan. 26, 2015.

(51) Int. Cl.
*G01S 1/20* (2006.01)
*G01S 5/02* (2010.01)

(58) Field of Classification Search
CPC ............ G01S 5/0236; G01S 5/10; G01S 1/20; G01S 1/045; G01S 1/042; Y02D 30/70
See application file for complete search history.

(56) References Cited

U.S. PATENT DOCUMENTS

2011/0176440 A1* 7/2011 Frank .................... G01S 5/0215 370/252
2011/0286349 A1* 11/2011 Tee ......................... H04L 5/005 370/252
2012/0231809 A1 9/2012 Siomina
2013/0285856 A1 10/2013 Opshaug et al.
2014/0349582 A1 11/2014 Xiao et al.
2015/0011238 A1 1/2015 Tujkovic
2015/0215884 A1* 7/2015 Horvat .................. H04L 27/266 370/328
2016/0014778 A1* 1/2016 Zhou ..................... H04L 5/0053 370/252
2016/0050534 A1* 2/2016 Lim ...................... G01S 5/0236 370/252
2016/0157217 A1* 6/2016 Xue ........................ H04L 5/003 370/330
2018/0011163 A1* 1/2018 Han ...................... G01S 5/0236

OTHER PUBLICATIONS

3GPP Lte Advanced, LTE; Evolved Universal Terrestrial Radio Access (E-UTRA); Requirements for Support of radio resource management (3GPP TS 36.133 version 12.9.0, Release 12); Technical Specification. ETSI TS 136 133 V.12.9.0 (Oct. 2015).

3GPP Lte Advanced, LTE; Evolved Universal Terrestrial Radio Access (E-UTRA); Physical channels and modulation (3GPP TS 36.211 version 12.7.0, Release 12); Technical Specification. ETSI TS 136 211 V12.7.0 (Oct. 2015).

3GPP Lte Advanced, LTE; Evolved Universal Terrestrial Radio Access (E-UTRA) LTE Positioning Protocol (LPP) (3GPP TS 36.355 version 12.4.0, Release 12); Technical Specification. ETSI TS 136 355 V12.4.0 (Apr. 2015).

Non-Final Office Action dated Jun. 21, 2019 in connection with U.S. Appl. No. 15/539,896.

Notice of Allowance dated Dec. 13, 2019 in connection with U.S. Appl. No. 15/539,896.

* cited by examiner

Example UE

OTDOA (OBSERVED TIME DIFFERENCE OF ARRIVAL) POSITIONING ENHANCEMENT BY USING HETEROGENEOUS REFERENCE SIGNALS

REFERENCE TO RELATED APPLICATIONS

This application is a continuation of U.S. application Ser. No. 15/539,896 filed on Jun. 26, 2017, which claims priority to International Patent Application Number PCT/US2015/067400 filed on Dec. 22, 2015, which claims benefit to U.S. Provisional Application No. 62/107,627, filed on Jan. 26, 2015, the contents of which are herein incorporated by reference in its entirety.

FIELD

The present disclosure relates to wireless technology, and more specifically to techniques for improving positioning via OTDOA techniques through enhanced reference signal time difference (RSTD) measurement techniques.

BACKGROUND

Observed Time Difference Of Arrival (OTDOA) is a downlink positioning method in LTE. OTDOA is a multi-lateration method in which a UE (user equipment) measures the time of arrival (TOA) of signals received from multiple base stations (Evolved Node Bs (eNBs)) and computes a reference signal time difference (RSTD) that is reported to the network. 3GPP (the Third Generation Partnership Project) defines OTDOA by using the Positioning Reference Signal (PRS).

Indoor UEs will experience more pathloss than outdoor UEs when eNBs are located outdoors. Thus, the number of detectable cells can be reduced for an indoor UE, as a result of the lower SINR (Signal to Interference-plus-Noise Ratio). Indoor positioning is currently being studied by 3GPP RAN (Radio Access Network) WG1 (working group 1) for Rel-13 (Release 13 of the 3GPP specification).

In 3GPP TS (technical specification) 36.133, describing E-UTRAN (evolved universal terrestrial RAN) OTDOA RSTD measurements, the UE physical layer can be capable of reporting RSTD for the reference cell with (PRS SINR)>=−6 dB and all the neighbor cells with (PRS SINR) >=−13 dB. These SINRs were set based on considerations involving outdoor UEs. For indoor UEs, the SINRs can be more stringent due to the signal having to penetrate the building.

DETAILED DESCRIPTION

Figure 1:
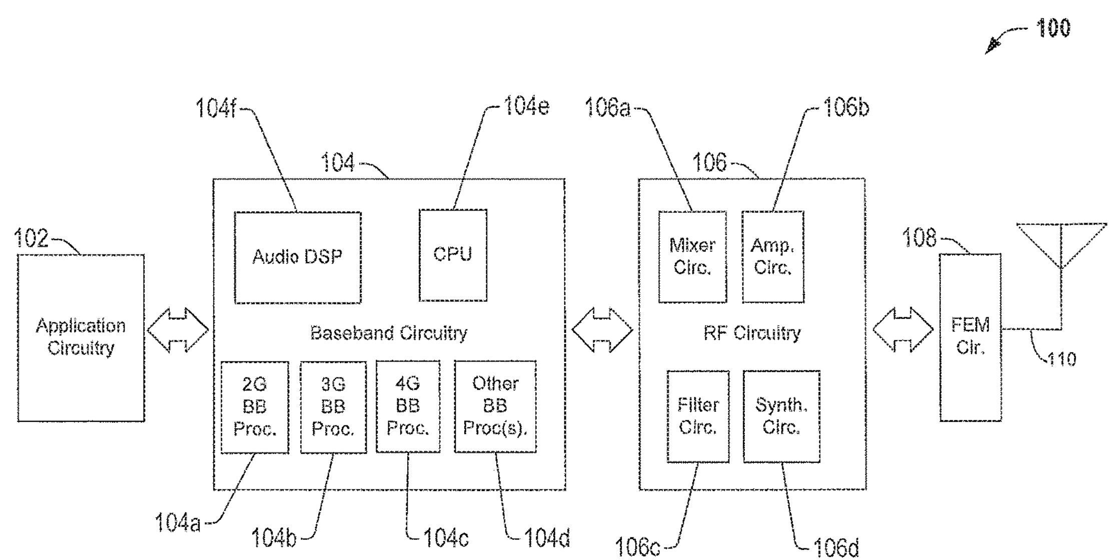
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband circuitry 104 may interface with the application circuitry 102 for generation and processing of the baseband signals and for controlling operations of the RF circuitry 106. For example, in some embodiments, the baseband circuitry 104 may include a second generation (2G) baseband processor 104*a*, third generation (3G) baseband processor 104*b*, fourth generation (4G) baseband processor 104*c*, and/or other baseband processor(s) 104*d* for other existing generations, generations in development or to be developed in the future (e.g., fifth generation (5G), 6G, etc.). The baseband circuitry 104 (e.g., one or more of baseband processors 104*a-d*) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104*e* of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104*f*. The audio DSP(s) 104*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106*a*, amplifier circuitry 106*b* and filter circuitry 106*c*. The transmit signal path of the RF circuitry 106 may include filter circuitry 106*c* and mixer circuitry 106*a*. RF circuitry 106 may also include synthesizer circuitry 106*d* for synthesizing a frequency for use by the mixer circuitry 106*a* of the receive signal path and the transmit signal path. In some embodiments, the mixer circuitry 106*a* of the receive signal path may be configured to down-convert RF signals received from the FEM circuitry 108 based on the synthesized frequency provided by synthesizer circuitry 106*d*. The amplifier circuitry 106*b* may be configured to amplify the down-converted signals and the filter circuitry 106*c* may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106*a* of the receive signal path may comprise passive mixers, although the scope of the embodiments is not limited in this respect.

In some embodiments, the mixer circuitry 106*a* of the transmit signal path may be configured to up-convert input baseband signals based on the synthesized frequency provided by the synthesizer circuitry 106*d* to generate RF output signals for the FEM circuitry 108. The baseband signals may be provided by the baseband circuitry 104 and may be filtered by filter circuitry 106*c*. The filter circuitry 106*c* may include a low-pass filter (LPF), although the scope of the embodiments is not limited in this respect.

In some embodiments, the mixer circuitry 106*a* of the receive signal path and the mixer circuitry 106*a* of the transmit signal path may include two or more mixers and may be arranged for quadrature downconversion and/or upconversion respectively. In some embodiments, the mixer circuitry 106*a* of the receive signal path and the mixer circuitry 106*a* of the transmit signal path may include two or more mixers and may be arranged for image rejection (e.g., Hartley image rejection). In some embodiments, the mixer circuitry 106*a* of the receive signal path and the mixer circuitry 106*a* may be arranged for direct downconversion and/or direct upconversion, respectively. In some embodiments, the mixer circuitry 106*a* of the receive signal path and the mixer circuitry 106*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106*d* may be a fractional-N synthesizer or a fractional N/N+1 synthesizer, although the scope of the embodiments is not limited in this respect as other types of frequency synthesizers may be suitable. For example, synthesizer circuitry 106*d* may be a delta-sigma synthesizer, a frequency multiplier, or a synthesizer comprising a phase-locked loop with a frequency divider.

The synthesizer circuitry 106*d* may be configured to synthesize an output frequency for use by the mixer circuitry 106*a* of the RF circuitry 106 based on a frequency input and a divider control input. In some embodiments, the synthesizer circuitry 106*d* may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106*d* of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

In various aspects, heterogeneous signals can be used for RSTD measurement for OTDOA. Accordingly, by increasing the energy, the overall location accuracy can be also improved. In various embodiments, the following example combinations can provide for better RSTD measurement performance: (1) PRS (positioning reference signal) in combination with CRS (cell-specific reference signal); (2) PRS in combination with CSI-RS (channel state information reference signal); or (3) PRS in combination with CRS and CSI-RS.

In a receiving UE, the correlation outputs from the multiple signals can be combined either coherently or non-coherently. Alternatively, the independent RSTD measurements conducted over different signals can be combined to get a weighted average channel estimate (or correlation output) to derive RSTD (e.g., w0*CH_CRS+w1*CH_PRS). To facilitate coherent combining among the heterogeneous signals, the heterogeneous reference signals can be defined as common antenna ports. In addition, the heterogeneous reference signals can be quasi-collocated for both coherent and non-coherent combining (e.g., at least for non-coherent combining) to prevent dispersed RSTD measurement results from the different signals. Further details regarding common antenna ports and quasi-collocation (QCL) are discussed below.

For accurate measurements from multiple eNBs, time and frequency reuse with low interference subframes can be utilized as much as possible. However, given the time frequency reuse factors (3 for CRS and 6 for PRS), the additional CRS-IC (interference cancellation), PRS-IC, CSI-IC or their combination can be used to acquire estimates from as many sources as possible and improve RSTD measurement accuracy. Intelligent interference cancelation techniques can measure the reference signal received power (RSRP) or quality (RSRQ) from multiple sources and can apply iterative compensation and/or cancellation in situations wherein collided CRS, PRS, CSI-RS patterns are used.

Various embodiments described herein can provide for enhanced RSTD measurement based on heterogeneous reference signals, which can facilitate improved positioning over conventional OTDOA positioning techniques.

Figure 2:
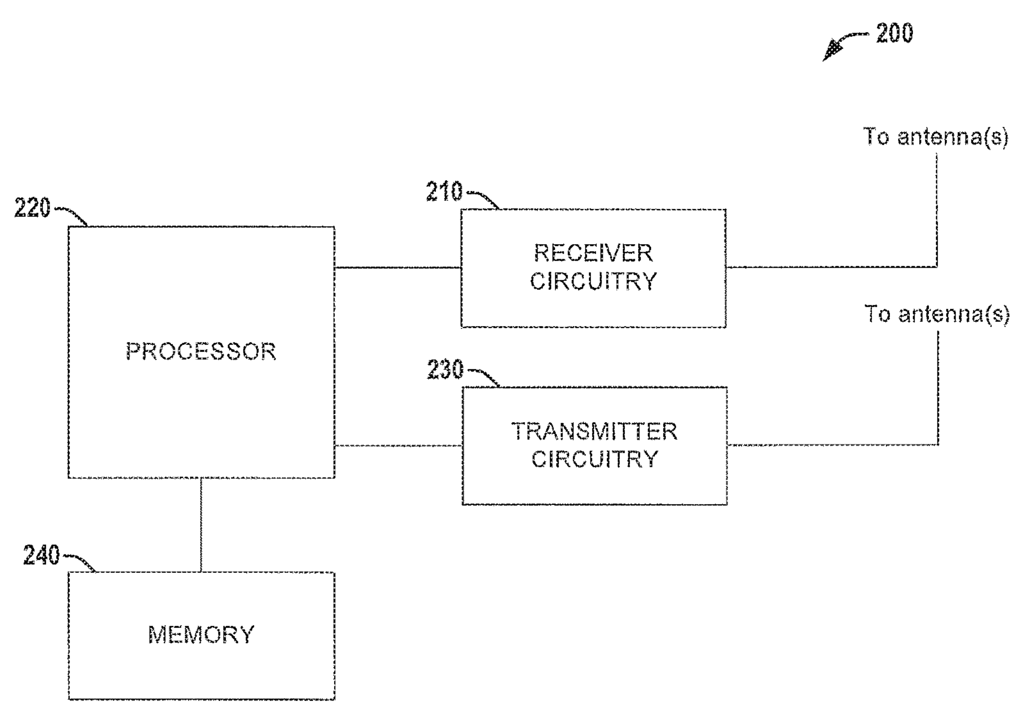
FIG. 2 is a block diagram of a system that facilitates RSTD measurement via heterogeneous reference signals (RSs) according to various aspects described herein.

Referring to FIG. 2, illustrated is a block diagram of a system 200 that facilitates RSTD measurement via heterogeneous reference signals (RSs) according to various aspects described herein. System 200 can include receiver circuitry 210, a processor 220, transmitter circuitry 230, and a memory 240 (which can comprise any of a variety of storage mediums and can store instructions and/or data associated with one or more of receiver circuitry 210, processor 220, or transmitter circuitry 230). In various aspects, system 200 can be included within a user equipment (UE). As described in greater detail below, system 200 can facilitate improved OTDOA positioning of the UE via RSTD measurements based on the heterogeneous RSs.

Receiver circuitry 210 can receive a set of RSs from each of a plurality of evolved Node Bs (eNBs), with the set of RSs including two or more distinct types of RSs, such as PRSs, CRSs, CSI-RSs, etc. Based on the locations of the UE and the one or more eNBs, these RSs can be, in general, received at varying times.

Optionally, in various aspects, receiver circuitry 210 can receive one or more configuration messages via higher layer signaling (e.g., RRC (radio resource control) and/or LPP (LTE (long term evolution) positioning protocol), etc.) that can facilitate RSTD measurement by system 200.

As a first example, a configuration message can designate a common antenna port (AP) associated with two or more disparate types of RSs from one or more eNBs. In some such aspects, the common AP (e.g., based on a common precoding vector, etc.) can be associated with the two or more disparate types of RSs from the one or more eNBs until a new configuration message indicates otherwise. In other such aspects, the common AP can be associated with the two or more disparate types of RSs from the one or more eNBs only during certain indicated times (e.g., subframes, etc.). Use of a common AP for disparate types of RSs can facilitate coherent combining, as discussed herein.

As a second example, a configuration message can designate one or more APs associated with different RSs from an eNB and indicate those APs as quasi-collocated (QCLed), indicating that one or more large-scale properties (e.g., one or more of delay spread, Doppler spread, Doppler shift, average gain, or average delay) of the channel over which a symbol on one of those APs is conveyed can be inferred from the channel over which a symbol on one of the other APs is conveyed.

Processor 220 can determine a time of arrival (TOA) for each of the received RSs from each of the eNBs. Based on the calculated TOAs from RSs received from an eNB, processor 220 can calculate a received signal time difference (RSTD) associated with that eNB. The RSTD for an eNB can be calculated in a variety of ways, which can depend on the specific embodiment and/or characteristics of the RSs received from that eNB (and potentially characteristics of the RSs received from one or more additional eNBs, in embodiments employing interference cancellation of certain types, such as interference mitigation).

As a first example embodiment, processor 220 can treat each of the distinct types of RSs separately, and can calculate an RS-specific RSTD associated with that type of RS (e.g., one or more of a PRS-RSTD, a CRS-RSTD, a CSI-RS-RSTD, etc.). Two or more RS-specific RSTDs for an eNB can be combined in a variety of ways to calculate the eNB for that eNB, such as based on a weighted average. In various aspects, different RS-specific RSTDs can be given the same or different weights, wherein different weights can be based on a variety of factors, such as the type of RS (e.g., PRS can receive a higher weight, etc.), quality of signal associated with the received RSs, etc.

As a second example embodiment, processor 220 can combine RSs of different types. For example, if different types of RSs are associated with a common AP (e.g., configured via higher layer signaling), those different types of RSs can be combined via coherent or non-coherent accumulation. As another example, RSs can be combined based on information that the APs for transmitting those RSs are QCLed (e.g., information that can be configured via higher layer signaling).

Transmitter circuitry 230 can transmit the RSTD calculated for each of the eNBs to a primary eNB of the plurality of eNBs.

Figure 3:
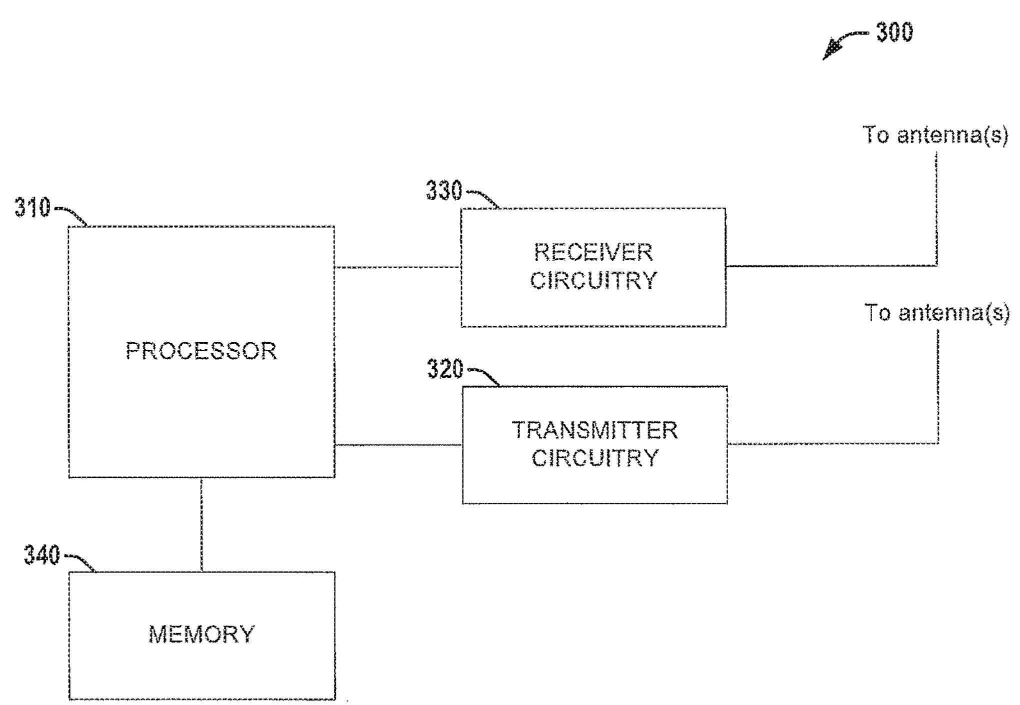
FIG. 3 is a block diagram of a system that facilitates improved positioning via OTDOA techniques through enhanced reference signal time difference (RSTD) measurement techniques according to various aspects described herein.

Referring to FIG. 3, illustrated is a block diagram of a system 300 that facilitates improved positioning via OTDOA techniques through enhanced reference signal time difference (RSTD) measurement techniques according to various aspects described herein. System 300 can include a processor 310, transmitter circuitry 320, optional receiver circuitry 330, and memory 340 (which can comprise any of a variety of storage mediums and can store instructions and/or data associated with one or more of processor 310, transmitter circuitry 320, or receiver circuitry 330). In various aspects, system 300 can be included within an Evolved Universal Terrestrial Radio Access Network (E-UTRAN) Node B (Evolved Node B, eNodeB, or eNB) or other base station in a wireless communications network. As described in greater detail below, system 300 can facilitate improved OTDOA positioning techniques via heterogeneous reference signals.

Processor 310 can optionally generate a configuration message that can configure a UE for enhanced RSTD measurement according to one or more aspects discussed herein. For example, the configuration message can configure a common AP for one or more distinct types of RSs (e.g., until reconfigured, or designating certain subframes or according to a predetermined or indicated pattern of subframes, etc.). Alternatively or additionally, the configuration message can configure the UE with information that APs associated with two or more distinct types of RSs are QCLed. In the same or other aspects, messaging that would conventionally only include the CP length for PRSs can be generated by processor 310 to additionally include the CP length for one or more distinct types of RSs, as well.

Additionally, processor 310 can generate a plurality of RSs, which can comprise two or more distinct types of RSs that can be employed by UEs to determine an RSTD associated with the eNB employing system 300.

Transmitter circuitry 320 can transmit the plurality of RSs to the UE, and when one or more configuration messages were generated by processor 310, transmitter circuitry 320 can transmit the one or more configuration messages to the UE via higher layer signaling (e.g., RRC and/or LPP, etc.).

Receiver circuitry 330 can receive a set of RSTD measurements from the UE, wherein one of the RSTD measurements is based at least in part on the two or more distinct types of RSs generated by processor 310.

Based on the received RSTDs and known positions of eNBs associated with the individual RSTDs, processor 310 can estimate the position of the UE. Because the RSTDs can be more accurately determined using various techniques discussed herein, the resulting position estimation will also be more accurate than via conventional techniques.

Figure 4:
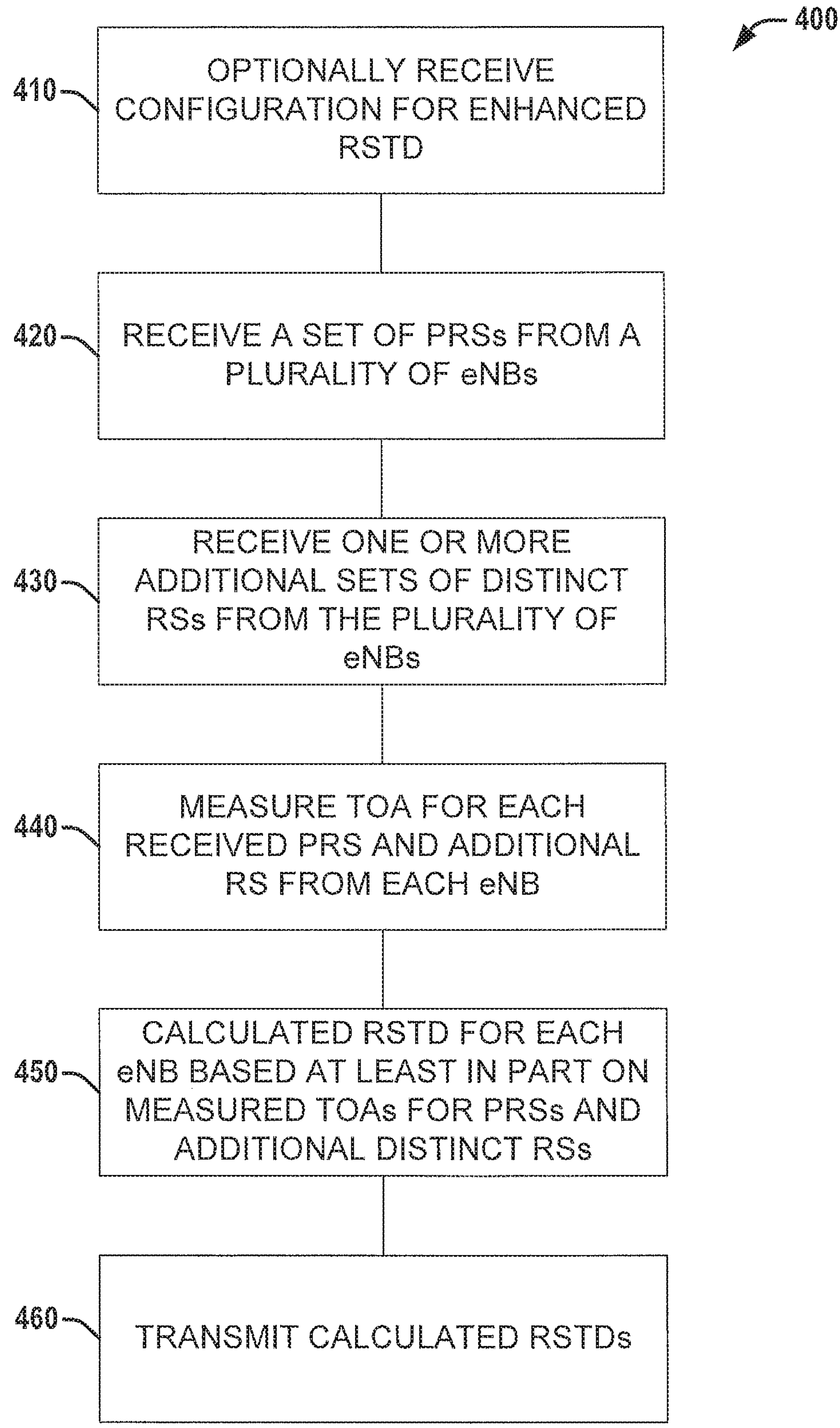
FIG. 4 is a flow diagram of a method that facilitates RSTD measurement by a user equipment (UE) via heterogeneous reference signals (RSs) according to various aspects described herein.

Referring to FIG. 4, illustrated is a flow diagram of a method 400 that facilitates RSTD measurement by a user equipment (UE) via heterogeneous reference signals (RSs) according to various aspects described herein. In some aspects, method 400 can be performed at a UE. In other aspects, a machine readable medium can store instructions associated with method 400 that, when executed, can cause a UE to perform the acts of method 400.

At 410, the UE can optionally be configured in one or more ways for enhanced RSTD measurement as discussed herein, such as by configuration messaging that indicates a common AP for one or more distinct types of RSs (either in general or for indicated subframes, etc.), indicates a QCL of two or more APs associated with distinct types of RSs, indicates additional information that facilitates RSTD determination based on multiple distinct types of RSs (e.g., CP lengths of not just PRS, but also of CRS and/or CSI-RS, etc.), etc.

At 420, a set of PRSs can be received from each of a plurality of eNBs.

At 430, one or more additional sets of RSs (e.g., CRSs, CSI-RSs, etc.) can be received from each of the plurality of eNBs.

At 440, for each of the eNBs, a TOA can be measured for each of the received PRSs from that eNB and a TOA can be measured for each RS of the additional sets of distinct RSs from that eNB.

At 450, based on the measured TOAs for the PRSs and the one or more additional RSs, a RSTD can be determined for each of the eNBs. Depending on the specific embodiment and situation, one or more different techniques can be applied to determine a RSTD for a given eNB. For example, in some situations (e.g., with a common AP configured), coherent or non-coherent combining of the PRSs with the distinct types of RSs can be employed. In some situations, e.g., if a common AP is employed and certain RSs from two or more eNBs collide but others do not, interference cancellation can be employed to facilitate RSTD determination. As another example, whether or not common APs are employed or QCL is assumed for different APs, a weighted average of multiple RS-specific RSTDs can be determined, which can provide an improved estimate over the RSTD that could be generated based only on a single type of RS.

At 460, the determined RSTDs can be transmitted to an eNB of a primary cell associated with the eNB employing method 400.

Figure 5:
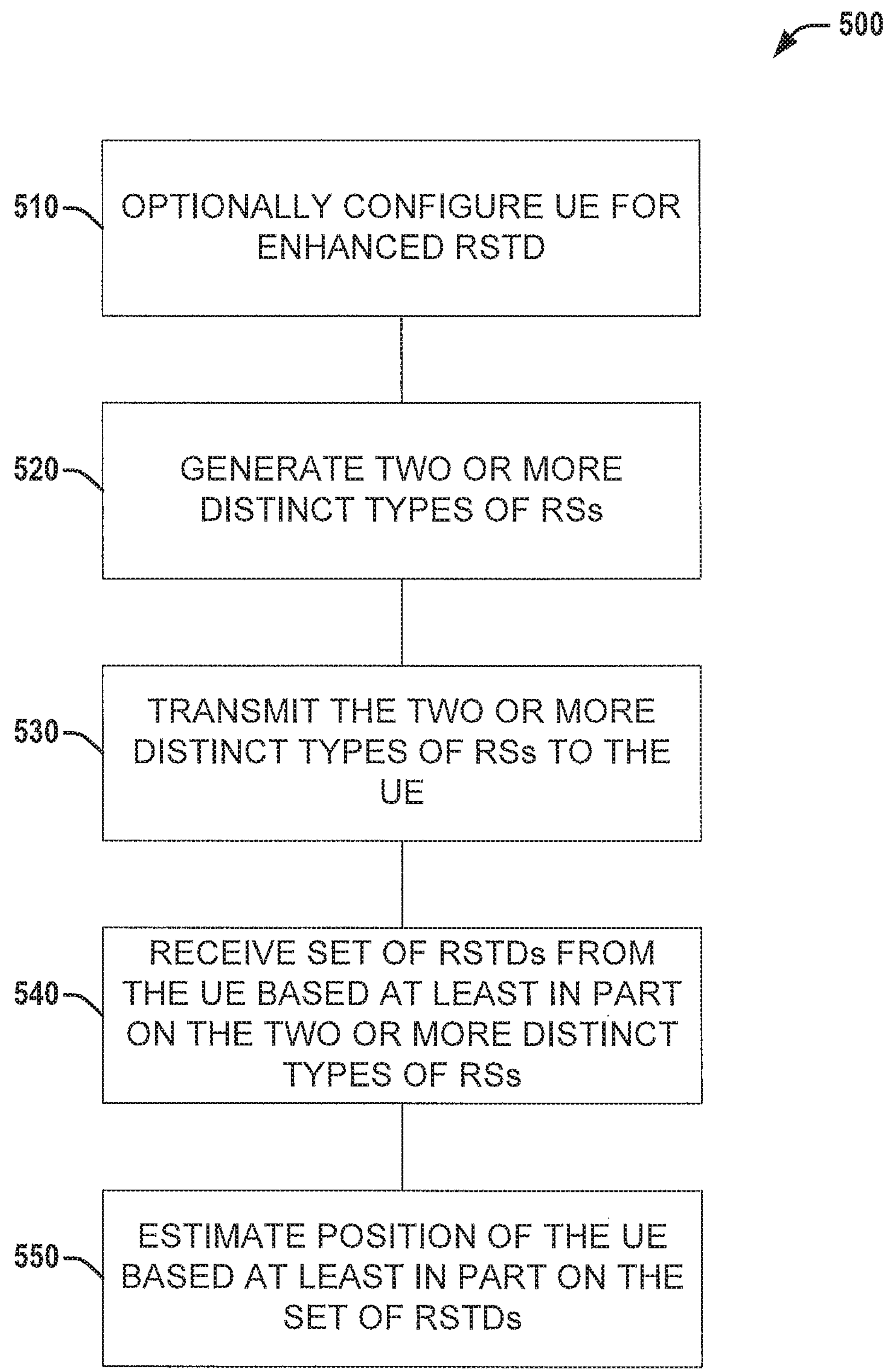
FIG. 5 is a flow diagram of a method that facilitates RSTD measurement by one or more UEs based on a heterogeneous set of RSs according to various aspects described herein.

Referring to FIG. 5, illustrated is a flow diagram of a method 500 that facilitates RSTD measurement by one or more UEs based on a heterogeneous set of RSs according to various aspects described herein. In some aspects, method 500 can be performed at an eNB. In other aspects, a machine readable medium can store instructions associated with method 500 that, when executed, can cause an eNB to perform the acts of method 500.

At 510, a UE can be optionally configured to employ one or more techniques for enhanced RSTD determination according to various aspects discussed herein.

At 520, two or more distinct types of RSs (e.g., PRSs, CRSs, CSI-RSs, etc.) can be generated that can be employed by the UE for RSTD determination.

At 530, the two or more distinct types of RSs can be transmitted to the UE.

At 540, a set of RSTD measurements can be received from the UE, with each RSTD measurement of the set associated with a distinct eNB, and a first RSTD of the set of RSTDs associated with the eNB employing method 500. At least the first RSTD can be based on the two or more distinct types of RSs, via one or more of the enhanced RSTD determination techniques discussed herein.

At 550, a position of the UE can be determined, based on the set of RSTD measurements and known positions of the eNBs associated with those RSTD measurements.

Figure 6:
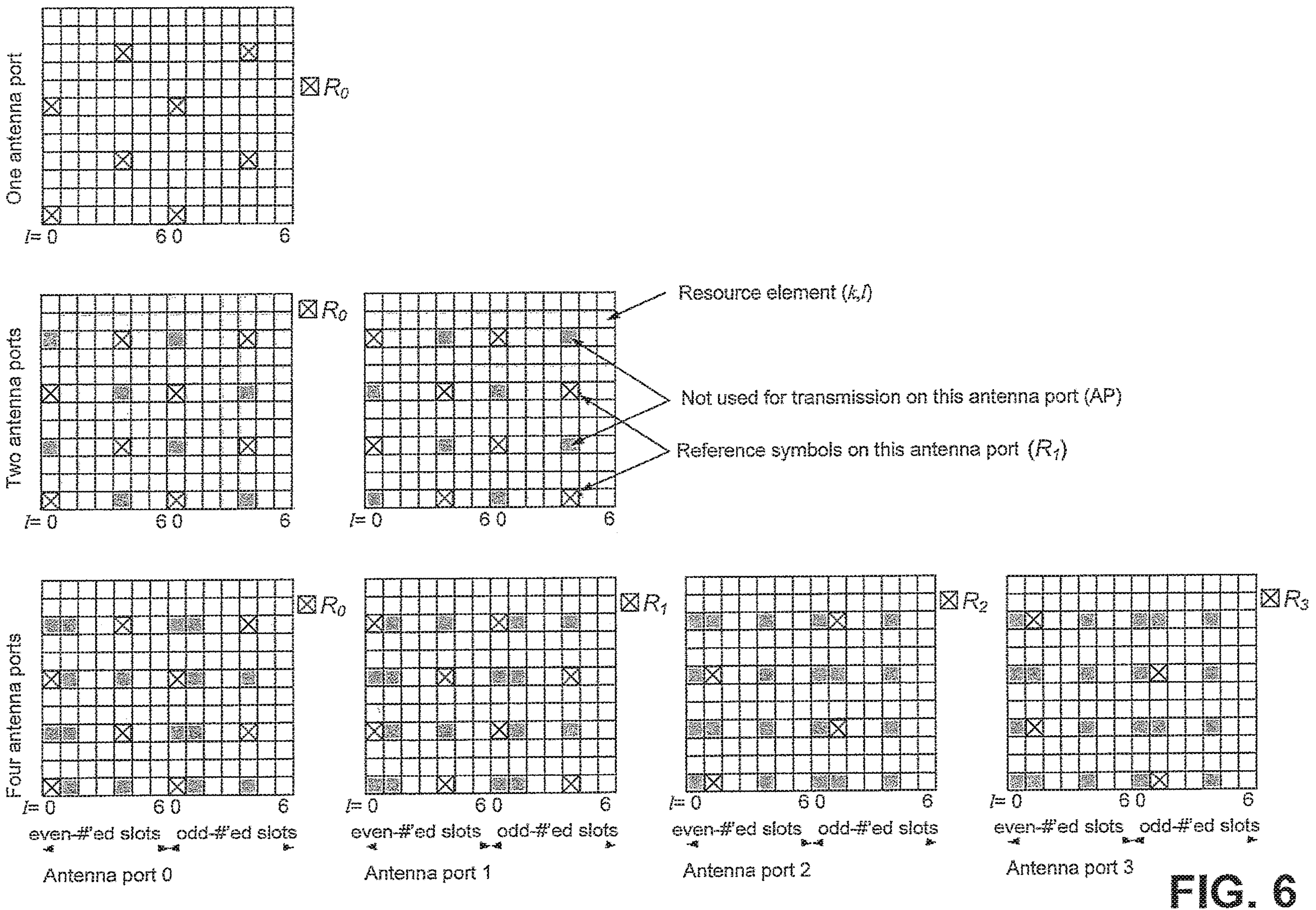
FIG. 6 is a time-frequency diagram illustrating cell-specific reference signal (CRS) mapping for normal cyclic prefix (CP), which can be employed for enhanced reference signal time difference (RSTD) determination according to various aspects described herein.
Figure 7:
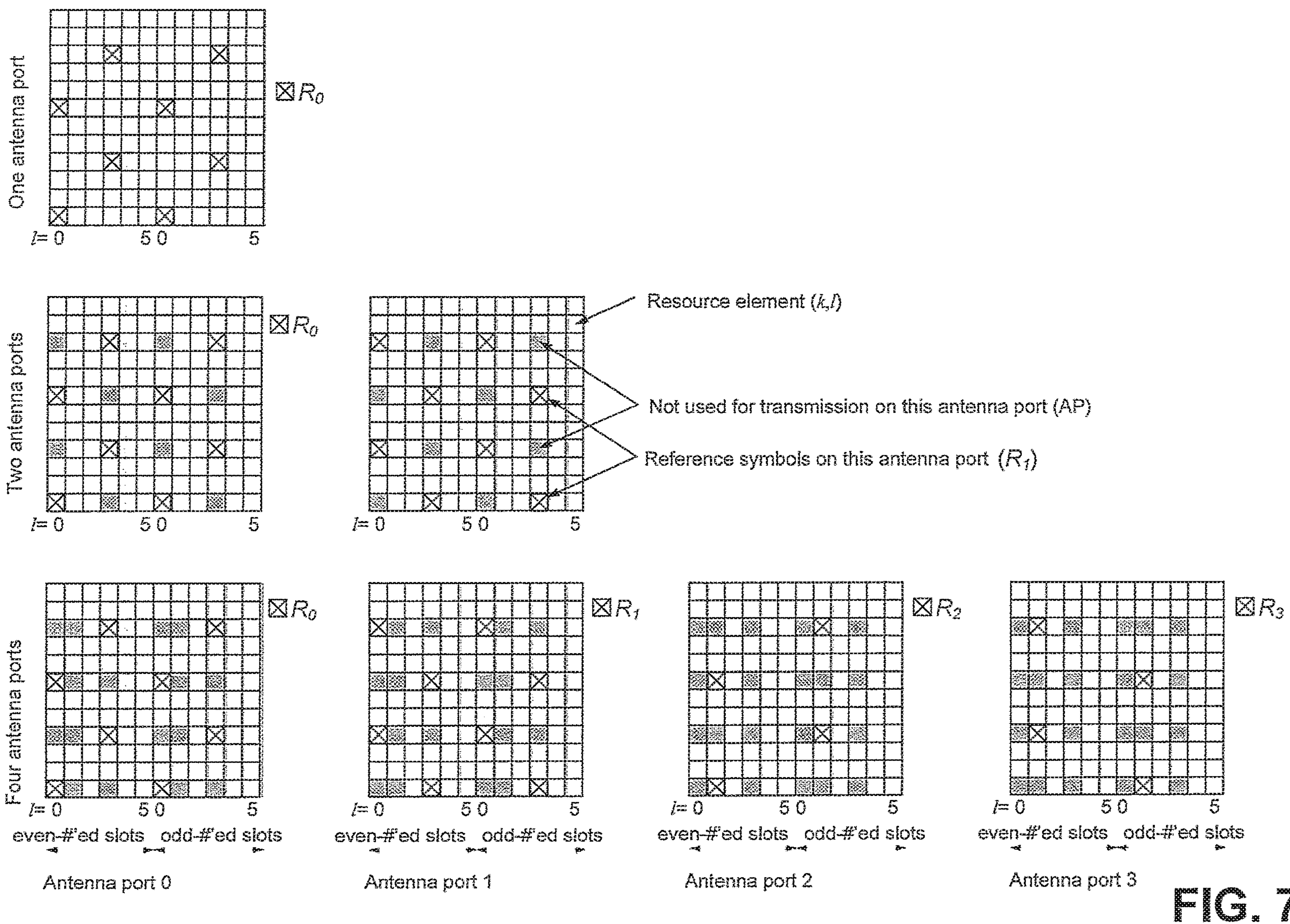
FIG. 7 is a time-frequency diagram illustrating CRS mapping for extended CP, which can be employed for enhanced RSTD determination according to various aspects described herein.

Referring to FIG. 6 and FIG. 7, illustrated is the CRS (cell-specific reference signal) mapping for normal CP (cyclic prefix) in FIG. 6, and the CRS mapping for extended CP at FIG. 7. In various embodiments, CRS can be employed in connection with one or more other RSs for OTDOA.

Figure 8:
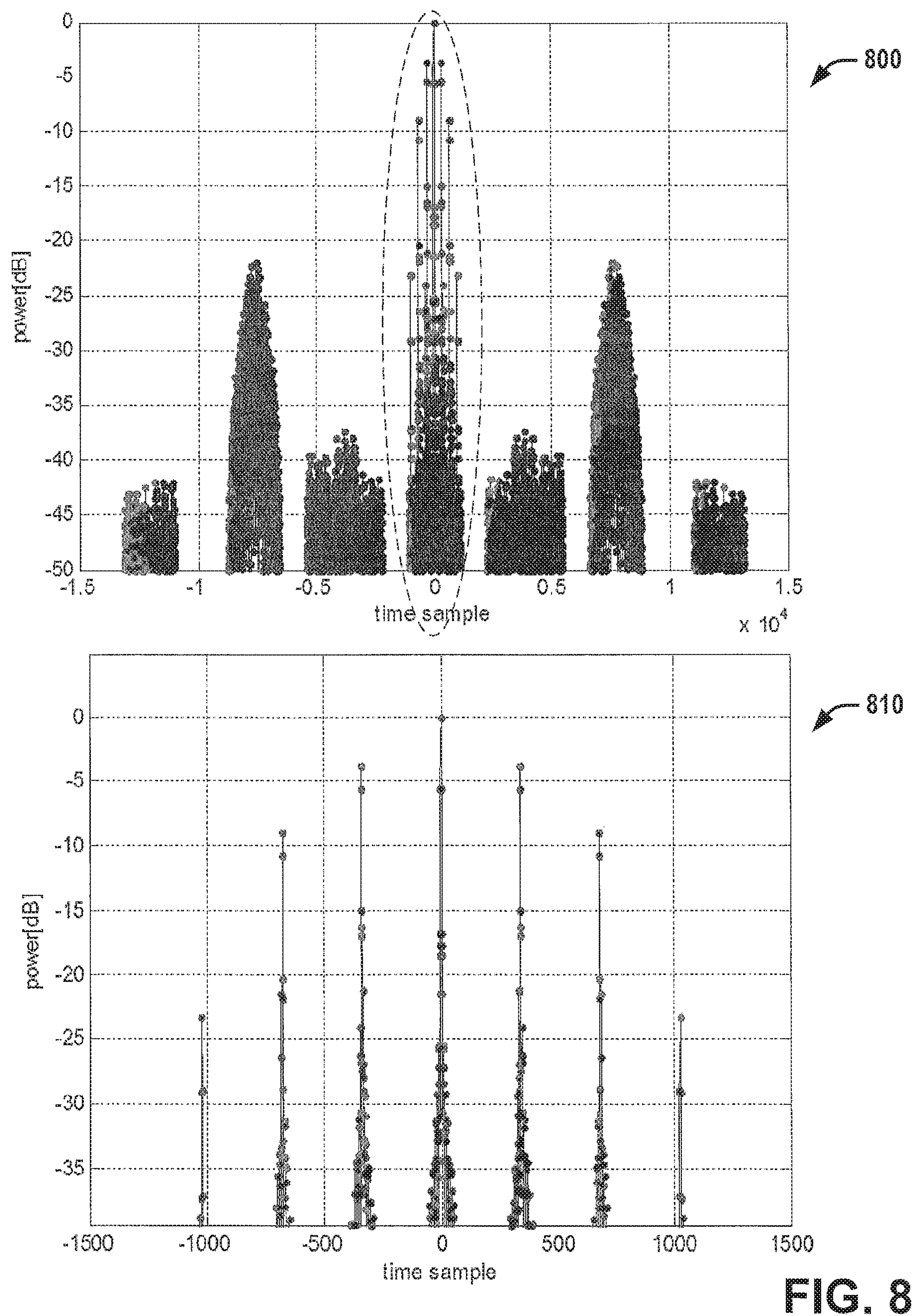
FIG. 8 is a pair of graphs illustrating the autocorrelation profile (a significant factor for RSTD accuracy) for CRS by coherent accumulation within a subframe.

Referring to FIG. 8, illustrated is the autocorrelation profile (a significant factor for RSTD accuracy) for CRS by coherent accumulation within a subframe at 800, along with an expanded view of the region within the dashed oval at 810. As seen in the autocorrelation profile of FIG. 8, CRS has ambiguity peaks due to the alternated mapping at every three subcarriers in the frequency domain (as can be seen in FIGS. 6 and 7), which results in 3 repetitive waveforms in the time domain. The strongest ambiguity peak appears as −3 dB relative to the target peak.

To mitigate the ambiguity peaks, one or more of smoothing, interpolating, or filtering can be employed in the frequency domain, so that the interpolated channel can be estimated for each RE (resource element) and an IFFT (inverse fast Fourier transform) can be taken to estimate the time of the actual peak or first path of the channel impulse response.

Figure 9:
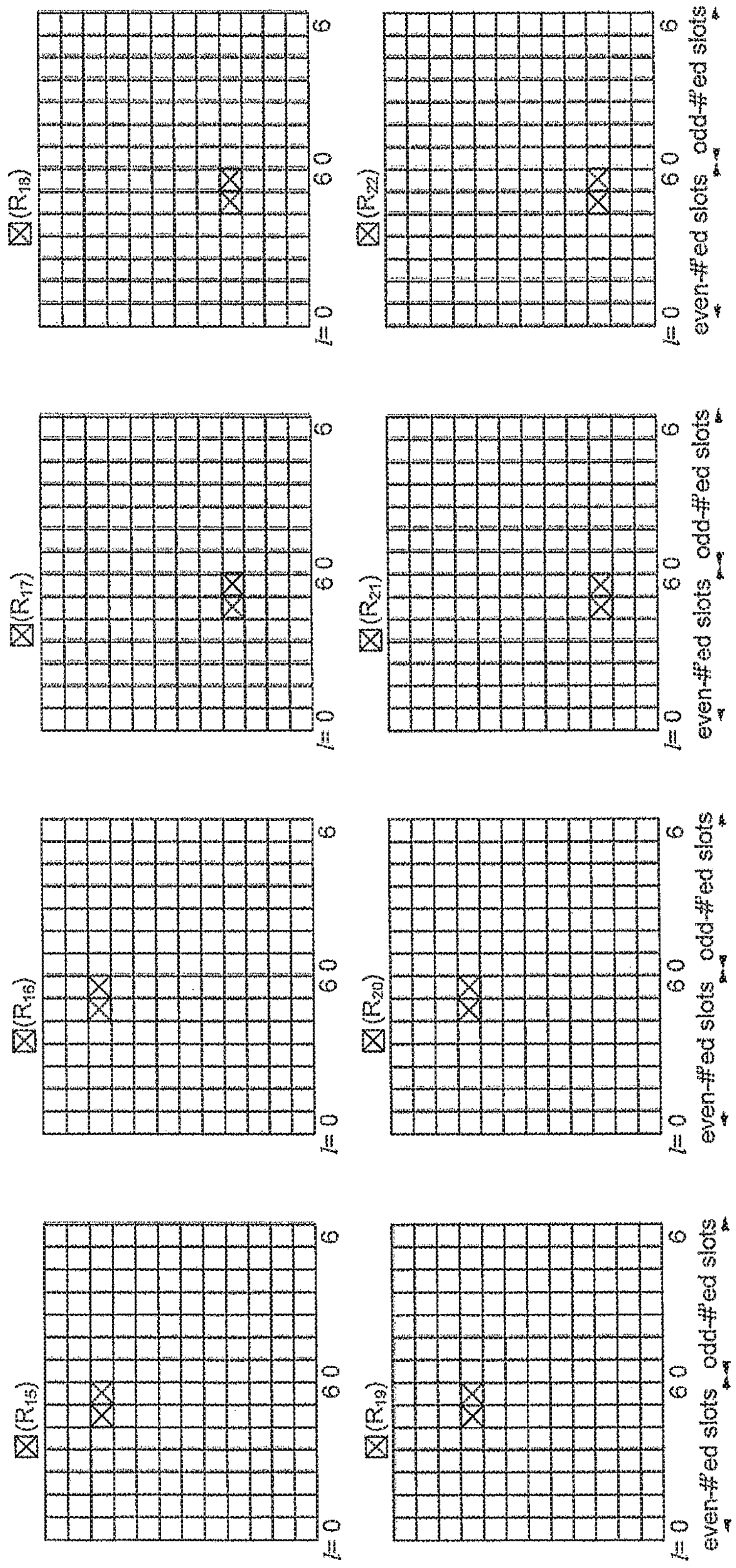
FIG. 9 is a time-frequency diagram illustrating a channel state information reference signal (CSI-RS) mapping for normal CP, which can be employed for enhanced RSTD determination according to various aspects described herein.
Figure 10:
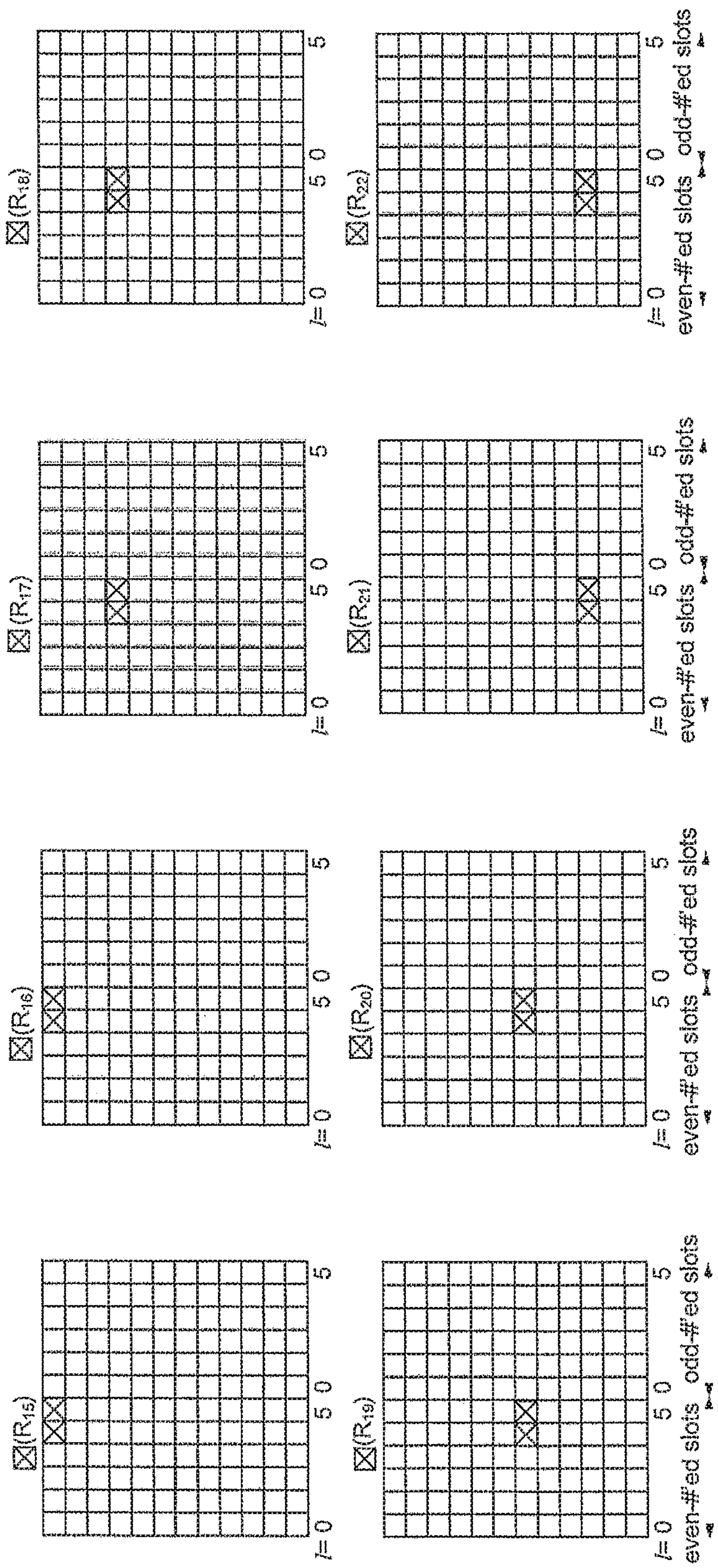
FIG. 10 is a time-frequency diagram illustrating a CSI-RS mapping for extended CP, which can be employed for enhanced RSTD determination according to various aspects described herein.

Referring to FIG. 9 and FIG. 10, illustrated is the CSI-RS (channel state information reference signal) mapping for normal CP (cyclic prefix) in FIG. 9, and the CSI-RS mapping for extended CP at FIG. 10. In various embodiments, CSI-RS can be employed in connection with one or more other RSs for OTDOA.

Figure 11A:
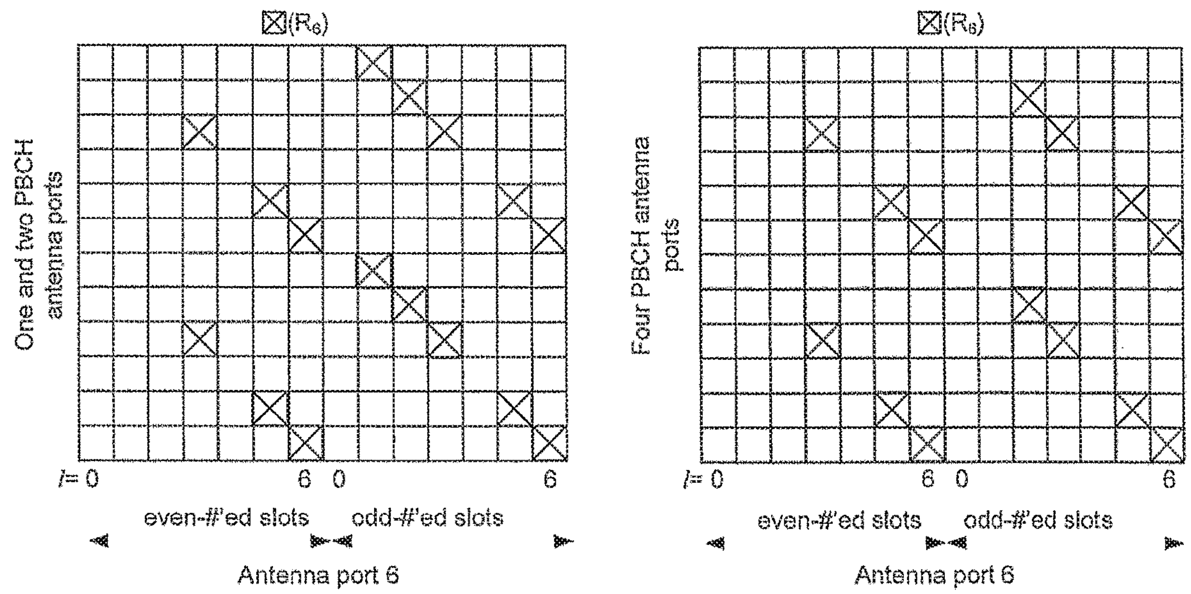
FIG. 11A is a time-frequency diagram illustrating positioning reference signal (PRS) mapping for normal CP, which can be employed for enhanced RSTD determination according to various aspects described herein.
Figure 11B:
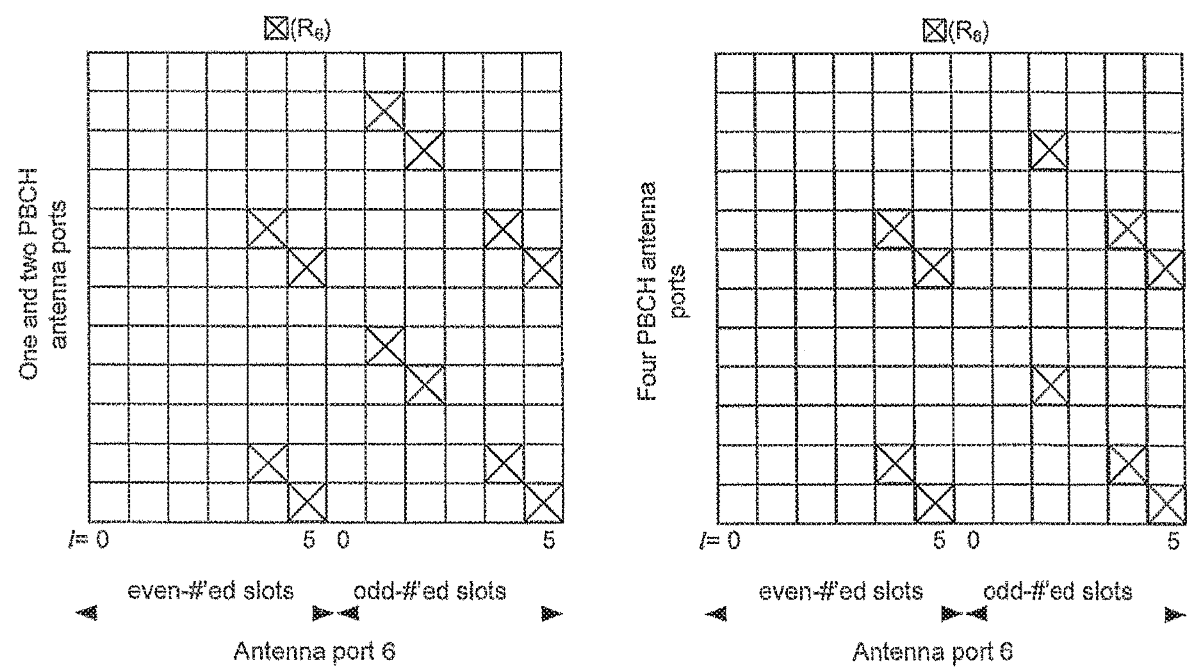
FIG. 11B is a time-frequency diagram illustrating PRS mapping for extended CP, which can be employed for enhanced RSTD determination according to various aspects described herein.

Referring to FIG. 11A and FIG. 11B, illustrated is the PRS (positioning reference signal) mapping for normal CP (cyclic prefix) in FIG. 11A, and the PRS mapping for extended CP at FIG. 11B. In various embodiments, PRS can be employed in connection with one or more other RSs for OTDOA.

Figure 12:
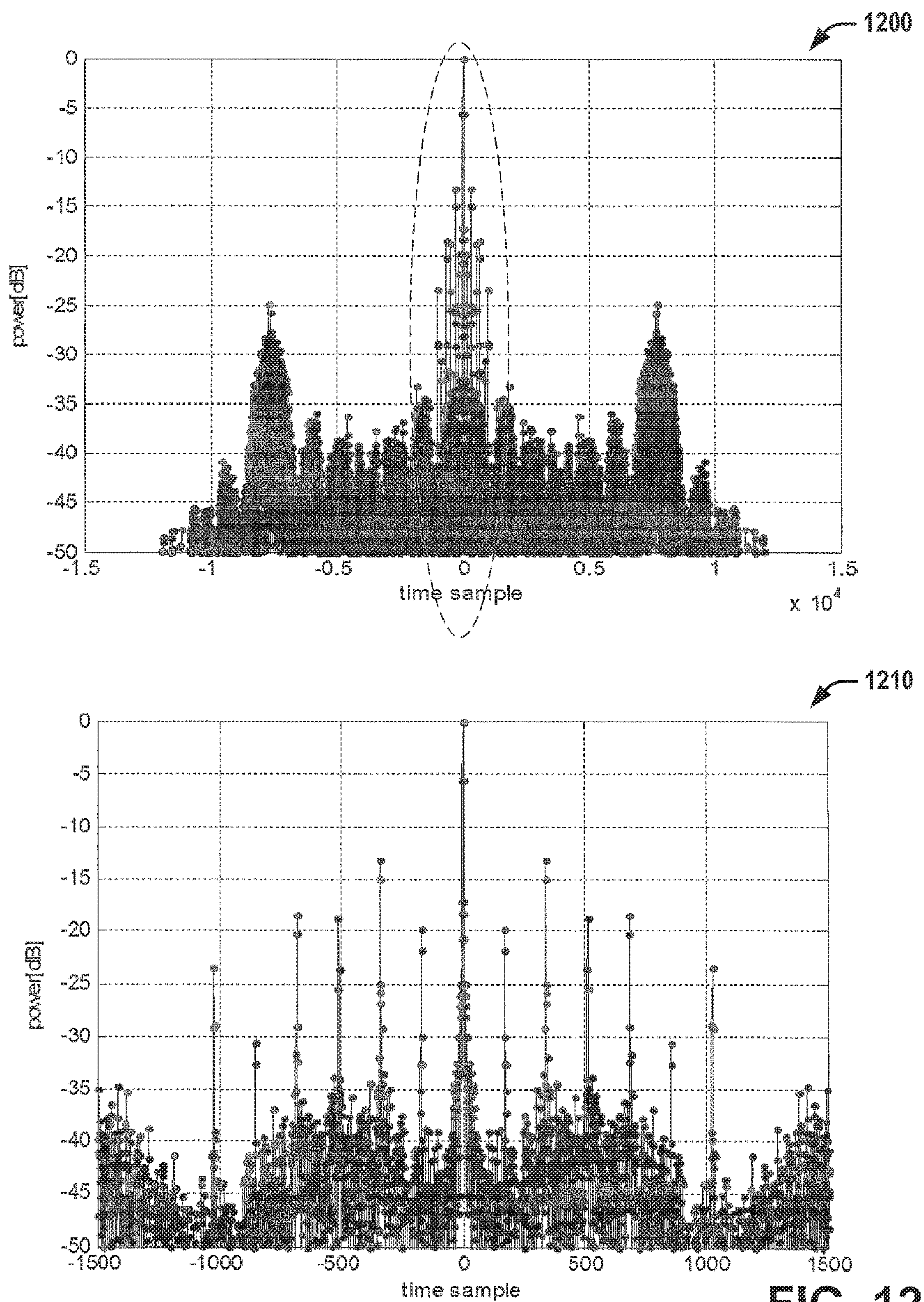
FIG. 12 is a pair of graphs illustrating the autocorrelation profile (a significant factor for RSTD accuracy) for PRS by coherent accumulation within a subframe.

Referring to FIG. 12, illustrated is the autocorrelation profile (a significant factor for RSTD accuracy) for PRS by coherent accumulation within a subframe at 1200, along with an expanded view of the region within the dashed oval at 1210. As can be seen in FIGS. 11A and 11B, PRS occupies as many REs as possible, excluding OFDM (orthogonal frequency division multiplexing) symbols possibly containing CRS, which provides a good autocorrelation profile. For example, as seen in FIG. 12, the strongest ambiguity peak appears at around −13 dB relative to the target peak.

Antenna ports are configured in LTE (long term evolution) such that the channel over which a symbol on the antenna port is conveyed can be inferred from the channel over which another symbol on the same antenna port is conveyed. For each of a variety of types of reference signals—MBSFN (Multimedia Broadcast multicast service Single Frequency Network) reference signals, positioning reference signals, UE-specific reference signals associated with PDSCH (physical downlink shared channel), and demodulation reference signals associated with EPDCCH (enhanced physical downlink control channel)—limits are provided below within which the channel can be inferred from one symbol to another symbol on the same antenna port. There is one resource grid per antenna port. The set of antenna ports supported depends on the reference signal configuration in the cell, which can be of any of the following types of reference signals: cell-specific reference signals, MBSFN reference signals, UE-specific reference signals, demodulation reference signals, positioning reference signals, CSI reference signals, etc.

Cell-specific reference signals support a configuration of one, two, or four antenna ports and are transmitted on antenna ports $p=0$, $p \in \{0, 1\}$, and $p \in \{0, 1, 2, 3\}$, respectively.

MBSFN reference signals are transmitted on antenna port $p=4$. The channel over which a symbol on antenna port $p=4$ is conveyed can be inferred from the channel over which another symbol on the same antenna port is conveyed when the two symbols correspond to subframes of the same MBSFN area.

UE-specific reference signals associated with PDSCH are transmitted on antenna port(s) $p=5$, $p=7$, $p=8$, or one or several of $p \in \{7, 8, 9, 10, 11, 12, 13, 14\}$. The channel over which a symbol on one of these antenna ports is conveyed can be inferred from the channel over which another symbol on the same antenna port is conveyed when the two symbols are within the same subframe and in the same PRG (precoding resource block group) when PRB (physical resource block) bundling is used or in the same PRB pair when PRB bundling is not used.

Demodulation reference signals associated with EPDCCH are transmitted on one or several of $p \in \{107, 108, 109, 110\}$. The channel over which a symbol on one of these antenna ports is conveyed can be inferred from the channel over which another symbol on the same antenna port is conveyed when the two symbols are in the same PRB pair.

Positioning reference signals are transmitted on antenna port $p=6$. The channel over which a symbol on antenna port $p=6$ is conveyed can be inferred from the channel over which another symbol on the same antenna port is conveyed within one positioning reference signal occasion consisting of $N_{PRS}$ consecutive downlink subframes, where $N_{PRS}$ is configured by higher layers.

CSI reference signals support a configuration of one, two, four or eight antenna ports and are transmitted on antenna ports $p=15$; $p=15, 16$; $p=15, \ldots, 18$; and $p=15, \ldots, 22$, respectively.

Two antenna ports are referred to herein as quasi co-located (QCL) when one or more large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, or average delay.

Thus, the coherent combining between different antenna ports is not possible. Also, with different QCL assumption between different antenna ports, combining reference signals (either for coherent or non-coherent combining) can deteriorate the RSTD measurement performance.

In a first set of embodiments, heterogeneous reference signals can be combined in one or more ways for RSTD measurement. Thus, in various aspects, when a UE measures RSTD, more than one kind of RS can be used. Example combinations include PRS+CRS, PRS+CSI-RS, or PRS+CRS+CSI-RS.

In a second set of embodiments, a common antenna port (AP) can be employed for the heterogeneous reference signals, which can facilitate coherent accumulation at a receiving UE. In various aspects, the UE can be configured to assume the common AP for the heterogeneous reference signals by higher layer signaling (e.g., RRC (radio resource control) or LPP (LTE (long term evolution) positioning protocol) signaling, etc.).

In a third set of embodiments, QCL (quasi-collocation) among the antenna ports for the heterogeneous signals can be assumed by a receiving UE. In various aspects, the UE can be configured to assume QCL for the antenna ports of the heterogeneous reference signals by higher layer signaling (e.g., RRC or LPP signaling, etc.).

Figure 13:
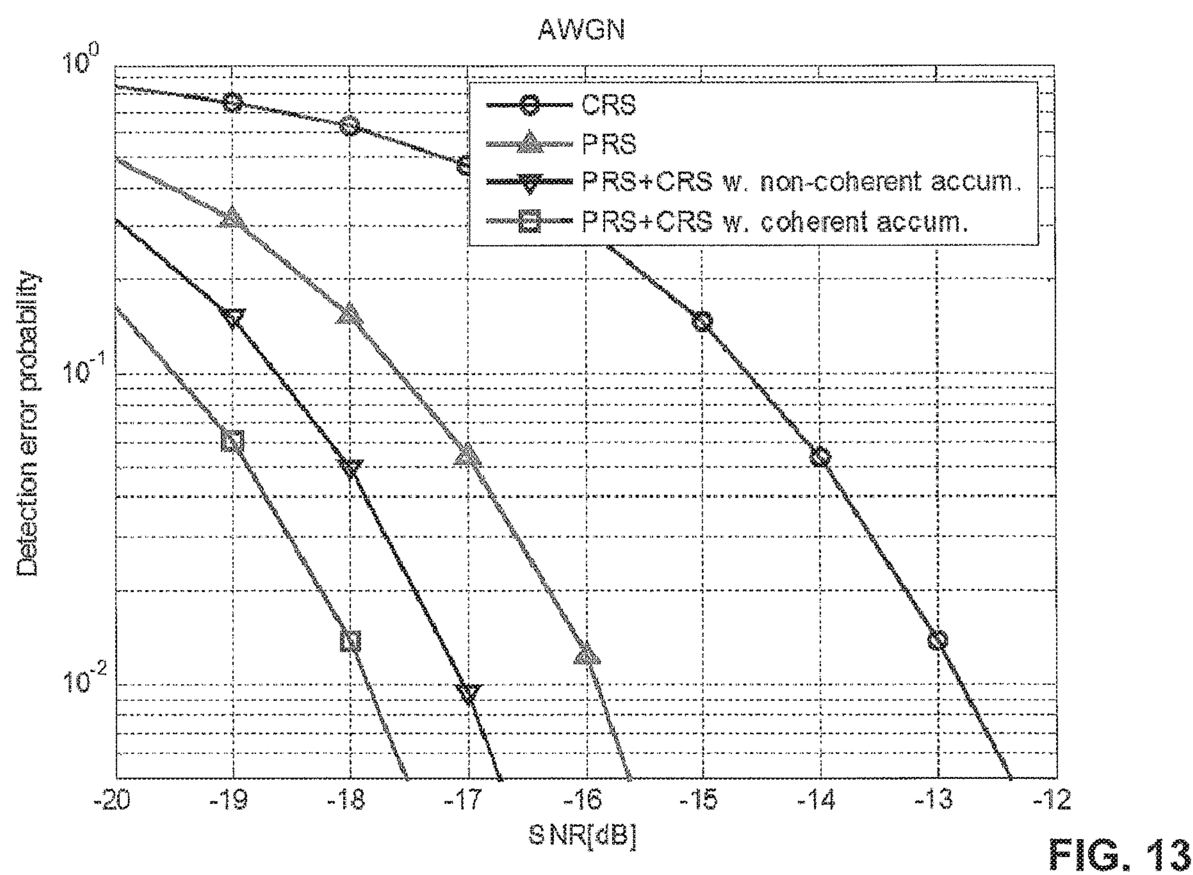
FIG. 13 is a graph of link level simulation results illustrating a comparison of the gain of multiple embodiments according to various aspects described herein.

Referring to FIG. 13, illustrated is a graph of link level simulation results comparing the gain of multiple embodiments according to various aspects discussed herein. The simulation was performed in an environment assuming AWGN (additive white Gaussian noise). A 10 MHz system bandwidth was assumed and RSTD measurement was performed in a single subframe. When the measured RSTD was within ±5 Ts (e.g., as defined in 3GPP TS 36.133), the measurement was regarded as successful; otherwise, it was considered error. For the results shown for PRS+CRS with coherent accumulation and non-coherent accumulation, the APs for the different types of RSs were assumed to be QCLed as per the third set of embodiments discussed above.

As can be seen in FIG. 13, the simulation results indicate that: the existing PRS based RSTD measurement outperforms the existing CRS based one by 3.13 dB SNR, that the PRS+CRS based RSTD measurement with non-coherent accumulation according to embodiments discussed herein outperforms the existing CRS based one by 4.36 dB SNR and the existing PRS based one by 1.23 dB SNR, and that the PRS+CRS based RSTD measurement with coherent accumulation according to embodiments discussed herein outperforms the existing CRS based one by 5.03 dB SNR and the existing PRS based one by 1.90 dB SNR.

In a fourth set of embodiments, the CP (cyclic prefix) length for the different reference signals can be signaled together with PRS CP length. According to 3GPP TS 36.355, cpLength is signaled for the reference cell and neighbor cell(s). However, as indicated below, there is no CP information for other RSs if PRS information is configured. Thus, the other CP related information (e.g. CP information itself or implication of the CP for other RSs—e.g. the same CP for other RSs as that for PRS) for the other RSs (e.g., CRS and/or CSI-RS, etc.) can be signaled together with PRS CP length.

cpLength

This field specifies the cyclic prefix length of the assistance data reference cell PRS if the prsInfo field is present, otherwise this field specifies the cyclic prefix length of the assistance data reference cell CRS.

In a fifth set of embodiments, the heterogeneous signals can be employed in a TDM (time division multiplexing) manner as described herein.

Given that the PRS antenna port and CRS antenna port(s) do not necessarily represent the same physical antenna and may utilize different antenna precoding vectors, coherent combining may not be appropriate at the receiver. However, if multiple RSTD measurements are used, it can be beneficial to utilize spatial diversity and use different precodings for the PRS transmission at different time instances. For example, at certain time instances, the PRS precoding can be the same as used for one of the CRS antenna ports. If the number of CRS antenna ports is greater than 1, then the receiving UE can be configured with whether at certain subframes the PRS antenna port coincides with the CRS antenna port(s), and thus coherent combining can be utilized in such situations.

In some aspects, a rule can be defined and interlaced (at the subframe level) PRS transmissions from the same ports as used by CRS can be enabled, so that the receiver can be informed at which time instance "Y" (e.g., subframe Y, etc.) the PRS port is aligned with a CRS antenna port "X." Additionally, there can be time instances when the PRS and CRS ports are different (e.g., different precodings are used). In the latter case, instead of coherent combining, either non-coherent combining can be used or combining of RSTD measurements (e.g., as a weighted average, etc.) can be utilized.

In a sixth set of embodiments, RSTD measurement performance can be improved by assuming both QCL and a common AP for heterogeneous RSs. When the QCL assumption is applied and common APs are reused between two or more RSs (e.g., CRS and PRS, etc.), one (or more) of the RSs can be employed for channel estimation, and interference cancellation can also be applied. As an example, if CRSs from different cells collide, but PRSs do not collide, then more accurate initial channel estimation in the frequency domain can be done using PRS (in various aspects, this can also be done jointly with CRS, etc.). This channel can be used then for CRS-IC in order to estimate the channel for the neighbor cell which is collided in terms of CRS.

Additionally, in aspects, one or more embodiments can include aspects of more than one set of embodiments discussed herein, such as the first through sixth sets of embodiments listed above, or other embodiments described herein (e.g., with an example embodiment employing two or more of: heterogeneous RS combining, a common AP assumption for heterogeneous RSs, a QCL assumption between APs for heterogeneous RSs, etc.).

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a user equipment (UE), comprising receiver circuitry, a processor, and transmitter circuitry. The receiver circuitry is configured to receive, from each of a plurality of evolved Node Bs (eNBs), one or more RSs of each of a plurality of distinct types of RSs. The processor is configured to: determine, for each of the plurality of eNBs, a time of arrival (TOA) of the one or more RSs of each of the plurality of distinct types of RSs; and compute, for each of the plurality of eNBs, a reference signal time difference (RSTD) based at least in part on the TOAs of the one or more RSs of each of the plurality of distinct types of RSs. The transmitter circuitry is configured to transmit the RSTD computed for each of the plurality of eNBs.

Example 2 comprises the subject matter of example 1, wherein the one or more RSs of each of the plurality of distinct types of RSs comprise one or more positioning RSs (PRSs).

Example 3 comprises the subject matter of example 1, wherein the one or more RSs of each of the plurality of distinct types of RSs comprise one or more cell-specific RSs (CRSs).

Example 4 comprises the subject matter of example 1, wherein the one or more RSs of each of the plurality of distinct types of RSs comprise one or more channel state information RSs (CSI-RSs).

Example 5 comprises the subject matter of any of examples 1-4, including or omitting optional features, wherein, for at least one eNB of the plurality of eNBs, the processor is further configured to combine the one or more RSs of each of the plurality of distinct types of RSs, wherein each RSTD for the at least one eNB is based at least in part on the combined one or more RSs of each of the plurality of distinct types of RSs.

Example 6 comprises the subject matter of any variation of example 5, wherein the processor is configured to combine the one or more RSs of each of the plurality of distinct types of RSs coherently.

Example 7 comprises the subject matter of any variation of example 5, wherein the processor is configured to combine the one or more RSs of each of the plurality of distinct types of RSs non-coherently.

Example 8 comprises the subject matter of any of examples 1-4, including or omitting optional features, wherein, for at least one eNB of the plurality of eNBs, the processor is further configured to compute, for each of the plurality of distinct types of RSs, an RS-specific RSTD based on the one or more RSs of that distinct type of RSs, wherein the RSTD for the at least one eNB of the plurality of eNBs is based on a weighted combination of the RS-specific RSTDs.

Example 9 comprises the subject matter of any of examples 1-4, including or omitting optional features, wherein the receiver circuit is further configured to receive a configuration message that indicates quasi-collocation of the one or more RSs of each of the plurality of distinct types of RSs received from a first eNB of the plurality of eNBs.

Example 10 comprises the subject matter of any of examples 1-2, including or omitting optional features, wherein the one or more RSs of each of the plurality of distinct types of RSs comprise one or more cell-specific RSs (CRSs).

Example 11 comprises the subject matter of any of examples 1-3, including or omitting optional features, wherein the one or more RSs of each of the plurality of distinct types of RSs comprise one or more channel state information RSs (CSI-RSs).

Example 12 comprises the subject matter of any of examples 1-8, including or omitting optional features, wherein the receiver circuit is further configured to receive a configuration message that indicates quasi-collocation of the one or more RSs of each of the plurality of distinct types of RSs received from a first eNB of the plurality of eNBs.

Example 13 comprises the subject matter of example 1, wherein, for at least one eNB of the plurality of eNBs, the processor is further configured to combine the one or more RSs of each of the plurality of distinct types of RSs, wherein each RSTD for the at least one eNB is based at least in part on the combined one or more RSs of each of the plurality of distinct types of RSs.

Example 14 comprises the subject matter of example 1, wherein, for at least one eNB of the plurality of eNBs, the processor is further configured to compute, for each of the plurality of distinct types of RSs, an RS-specific RSTD based on the one or more RSs of that distinct type of RSs, wherein the RSTD for the at least one eNB of the plurality of eNBs is based on a weighted combination of the RS-specific RSTDs.

Example 15 comprises the subject matter of example 1, wherein the receiver circuit is further configured to receive a configuration message that indicates quasi-collocation of the one or more RSs of each of the plurality of distinct types of RSs received from a first eNB of the plurality of eNBs.

Example 16 is a machine readable medium comprising instructions that, when executed, cause a user equipment (UE) to: receive, from each of a plurality of evolved Node Bs (eNBs), a set of positioning reference symbols (PRSs); receive, from each of the plurality of eNBs, one or more sets of additional RSs, wherein each of the additional RSs is a distinct type of RS from the PRSs; measure, for each of the plurality of eNBs, a time of arrival (TOA) of each PRS of the set of PRSs and a TOA of each additional RS of the one or more sets of additional RSs; calculate, for each of the plurality of eNBs, a reference signal time difference (RSTD) based at least in part on the TOAs of the each PRS of the set of PRSs and on the TOAs of each additional RS of the one or more sets of additional RSs; and transmit the RSTD for each of the plurality of eNBs.

Example 17 comprises the subject matter of example 16, wherein the instructions, when executed, further cause the UE to: receive a configuration message indicating a common antenna port associated with the set of PRSs and the one or more sets of additional RSs received from a first eNB of the plurality of eNBs, and combine the set of PRSs from the first eNB with the one or more sets of additional RSs from the first eNB, wherein the RSTD for the first eNB is calculated based at least in part on the combined set of PRSs and one or more sets of additional RSs from the first eNB.

Example 18 comprises the subject matter of example 17, wherein the instructions, when executed, cause the UE to combine the set of PRSs from the first eNB with the one or more sets of additional RSs from the first eNB coherently.

Example 19 comprises the subject matter of example 18, wherein the instructions, when executed, cause the UE to receive an additional message indicating one or more subframes wherein an antenna port associated with the set of PRSs received from the first eNB is aligned with one or more antenna ports associated with the one or more sets of additional RSs received from the first eNB.

Example 20 comprises the subject matter of example 17, wherein the instructions, when executed, cause the UE to combine the set of PRSs from the first eNB with the one or more sets of additional RSs from the first eNB non-coherently.

Example 21 comprises the subject matter of example 17, wherein the instructions, when executed, cause the UE to perform interference cancellation between the one or more sets of additional RSs received from a first eNB of the plurality of eNBs and the one or more sets of additional RSs received from a second eNB of the plurality of eNBs.

Example 22 comprises the subject matter of example 16, wherein the instructions, when executed, further cause the UE to: receive a configuration message indicating quasi co-location of an antenna port associated with the set of PRSs and the one or more antenna ports associated with the one or more sets of additional RSs received from a first eNB of the plurality of eNBs, and combine the set of PRSs from the first eNB with the one or more sets of additional RSs from the first eNB, wherein the RSTD for the first eNB is calculated based at least in part on the combined set of PRSs and one or more sets of additional RSs from the first eNB.

Example 23 comprises the subject matter of example 22, wherein the instructions, when executed, cause the UE to combine the set of PRSs from the first eNB with the one or more sets of additional RSs from the first eNB non-coherently.

Example 24 comprises the subject matter of any of examples 16-23, including or omitting optional features, wherein the instructions, when executed, further cause the UE to receive a configuration message that indicates a cyclic prefix (CP) length associated with the set of PRSs and one or more CP lengths associated with the one or more sets of additional RSs received from a first eNB of the plurality of eNBs.

Example 25 comprises the subject matter of example 16, wherein the instructions, when executed, further cause the UE to calculate, for at least a first eNB of the plurality of eNBs, a PRS-RSTD based on the set of PRSs received from the first eNB, and one or more additional RS-specific RSTDs based on the one or more sets of additional RSs received from the first eNB, wherein the RSTD is calculated based on a weighted combination of the PRS-RSTD and the one or more additional RS-specific RSTDs.

Example 26 comprises the subject matter of example 16, wherein the instructions, when executed, further cause the UE to receive a configuration message that indicates a cyclic prefix (CP) length associated with the set of PRSs and one or more CP lengths associated with the one or more sets of additional RSs received from a first eNB of the plurality of eNBs.

Example 27 is an apparatus configured to be employed within an evolved NodeB (eNB), comprising a processor, transmitter circuitry, and receiver circuitry. The processor is configured to: generate a configuration message that facilitates reference signal time difference (RSTD) computation based on at least two distinct types of reference signals (RSs); and generate a plurality of RSs comprising a set of one or more RSs of each of the at least two distinct types of RSs. The transmitter circuitry is configured to transmit the configuration message and the plurality of RSs to a user equipment (UE). The receiver circuitry is configured to receive a set of RSTD measurements from the UE. The processor is further configured to estimate a position of the UE based at least in part on the set of RSTD measurements.

Example 28 comprises the subject matter of example 27, wherein the configuration message indicates a common antenna port associated with each of the at least two distinct types of RSs.

Example 29 comprises the subject matter of example 27, wherein the configuration message indicates quasi-collocation of antenna ports associated with each of the at least two distinct types of RSs.

Example 30 comprises the subject matter of any of examples 27-29, including or omitting optional features, wherein the transmitter circuitry is configured to transmit the configuration message as a radio resource control (RRC) message.

Example 31 comprises the subject matter of any of examples 27-29, including or omitting optional features, wherein the transmitter circuitry is configured to transmit the configuration message as a long term evolution (LTE) positioning protocol (LPP) message.

Example 32 comprises the subject matter of any of examples 27-29, including or omitting optional features, wherein the transmitter circuitry is further configured to transmit a cyclic prefix (CP) length associated with each of the at least two distinct types of RSs to the UE.

Example 33 comprises the subject matter of any of examples 27-29, including or omitting optional features, wherein the transmitter circuitry is further configured to transmit a cyclic prefix (CP) length associated with each of the at least two distinct types of RSs to the UE.

Example 34 comprises the subject matter of example 27, wherein the transmitter circuitry is configured to transmit the configuration message as a radio resource control (RRC) message.

Example 35 comprises the subject matter of example 27, wherein the transmitter circuitry is configured to transmit the configuration message as a long term evolution (LTE) positioning protocol (LPP) message.

Example 36 comprises the subject matter of example 27, wherein the transmitter circuitry is further configured to transmit a cyclic prefix (CP) length associated with each of the at least two distinct types of RSs to the UE.

Example 37 is an apparatus configured to be employed within a user equipment (UE), comprising means for receiving, means for processing, and means for transmitting. The means for receiving is configured to receive, from each of a plurality of evolved Node Bs (eNBs), one or more RSs of each of a plurality of distinct types of RSs. The means for processing is configured to: determine, for each of the plurality of eNBs, a time of arrival (TOA) of the one or more RSs of each of the plurality of distinct types of RSs; and compute, for each of the plurality of eNBs, a reference signal time difference (RSTD) based at least in part on the TOAs of the one or more RSs of each of the plurality of distinct types of RSs. The means for transmitting is configured to transmit the RSTD computed for each of the plurality of eNBs.

Example 38 is an apparatus configured to be employed within an evolved NodeB (eNB), comprising means for processing, means for transmitting, and means for receiving. The means for processing is configured to: generate a configuration message that facilitates reference signal time difference (RSTD) computation based on at least two distinct types of reference signals (RSs); and generate a plurality of RSs comprising a set of one or more RSs of each of the at least two distinct types of RSs. The means for transmitting is configured to transmit the configuration message and the plurality of RSs to a user equipment (UE). The means for receiving is configured to receive a set of RSTD measurements from the UE. The means for processing is further configured to estimate a position of the UE based at least in part on the set of RSTD measurements.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A user equipment (UE), comprising:

receiver circuitry configured to receive, from each of a plurality of base stations, position reference signal (PRS) and cell-specific reference signal (CRS);

a processor configured to:

determine, for an individual base station of the plurality of base stations, reference signal time difference (RSTD) measurement results based on the PRS and the CRS received from the individual base station; and transmitter circuitry configured to transmit the determined RSTD measurement results for the individual base station.

2. The UE of claim 1, wherein the processor is configured to combine the PRS and the CRS from the individual base station coherently.

3. The UE of claim 1, wherein the processor is configured to combine the PRS and the CRS from the individual base station non-coherently.

4. The UE of claim 1, wherein, for the individual base station, the processor is further configured to compute, for each of the PRS and the CRS, a PRS-specific RSTD measurement based on the PRS and a CRS-specific RSTD measurement based on the CRS, wherein the RSTD measurement results determined for the individual base station of the plurality of base stations is based on a weighted combination of the PRS-specific RSTD measurement and the CRS-specific RSTD measurement.

5. The UE of claim 1, wherein the receiver circuitry is further configured to receive a configuration message that indicates quasi-collocation of the PRS and the CRS received from the individual base station of the plurality of base stations.

6. The UE of claim 1, wherein a cyclic prefix length of the CRS from the individual base station is signaled to the UE.

7. The UE of claim 1, wherein the processor is further configured to perform interference cancellation between one or more of:

the CRS received from the individual base station and CRS received from a second base station of the plurality of base stations, or the PRS received from the individual base station and PRS received from the second base station.

8. A method, comprising:

receiving, from each of a plurality of base stations, positioning reference signal (PRS) and cell-specific reference signal (CRS);

determining, for an individual base station of the plurality of base stations, reference signal time difference (RSTD) measurement results based on the PRS and the CRS received from the individual base station; and transmitting the determined RSTD measurement results for the individual base station of the plurality of base stations.

9. The method of claim 8, further comprising:

receiving a configuration message indicating a common antenna port associated with the PRS and the CRS received from the individual base station of the plurality of base stations, and combining the PRS from the individual base station with the CRS from the individual base station, wherein the RSTD measurement results for the individual base station is calculated based at least in part on the combined set of PRS and CRS from the individual base station.

10. The method of claim 9, further comprising combining the PRS and the CRS from the individual base station coherently.

11. The method of claim 10, further comprising receiving an additional message indicating one or more subframes, wherein an antenna port associated with the PRS received from the individual base station is aligned with one or more antenna ports associated with the CRS received from the individual base station.

12. The method of claim 9, further comprising combining the PRS and the CRS from the individual base station non-coherently.

13. The method of claim 9, further comprising performing interference cancellation between one or more of:

the CRS received from the individual base station and CRS received from a second base station of the plurality of base stations, or the PRS received from the individual base station and PRS received from the second base station.

14. The method of claim 8, further comprising:

receiving a configuration message indicating quasi colocation of an antenna port associated with the PRS received from the individual base station and one or more antenna ports associated with the CRS received from the individual base station, and combining the PRS and the CRS from the individual base station, wherein the RSTD measurement results for the individual base station are calculated based at least in part on the combined set of PRS and CRS from the individual base station.

15. The method of claim 14, further comprising combining the PRS from the individual base station with the CRS from the individual base station non-coherently.

16. The method of claim 8, further comprising receiving a configuration message that indicates a cyclic prefix (CP) length associated with the PRS received from the individual base station of the plurality of base stations.

17. The method of claim 8, further comprising calculating, for the individual base station of the plurality of base stations, a PRS-RSTD based on the PRS received from the individual base station, and a CRS-RSTD based on the CRS received from the individual base station, wherein the RSTD measurement results are calculated based on a weighted combination of the PRS-RSTD and the CRS-RSTD.

18. The method of claim 8, further comprising receiving signaling indicating a cyclic prefix length of the CRS from the individual base station.

19. The method of claim 8, further comprising receiving a configuration message that indicates quasi-collocation of the PRS and the CRS from the individual base station.

20. The method of claim 8, further comprising performing interference cancellation between one or more of:

the CRS received from the individual base station and CRS received from a second base station of the plurality of base stations, or the PRS received from the individual base station and PRS received from the second base station.

21. A baseband processor comprising processing circuitry configured to:

determine, for an individual base station of a plurality of base stations, reference signal time difference (RSTD) measurement results based on position reference signal (PRS) and cell-specific reference signal (CRS) received from the individual base station; and output the determined RSTD measurement results for the individual base station to transmitter circuitry for transmission.

22. The baseband processor of claim 21, further comprising determining, based on signaling, a cyclic prefix length of the CRS from the individual base station.

23. The baseband processor of claim 21, further comprising determining, based on a configuration message, quasi-collocation of the PRS and the CRS from the individual base station.

24. The baseband processor of claim 21, wherein the processing circuitry is further configured to perform interference cancellation between one or more of:

the CRS received from the individual base station and CRS received from a second base station of the plurality of base stations, or the PRS received from the individual base station and PRS received from the second base station.

* * * * *